US012743538B2

(12) United States Patent
Ravindranath et al.

(10) Patent No.: US 12,743,538 B2
(45) Date of Patent: Sep. 22, 2026

(54) SYSTEMS AND METHODS FOR SCRAMBLING CELLS OF A DATA STRUCTURE

(71) Applicant: Google LLC, Mountain View, CA (US)

(72) Inventors: Radhika Ravindranath, South Plainfield, NJ (US); James Paul Black, Sunnyvale, CA (US); Jacques Mouton, Tampa, FL (US); Frankie Lamar, Jr., New York, NY (US); Dev Narendrabhai Patel, Gujarat (IN); Benjamin Kaplan, Los Angeles, CA (US)

(73) Assignee: Google LLC, Mountain View, CA (US)

( * ) Notice: Subject to any disclaimer, the term of this patent is extended or adjusted under 35 U.S.C. 154(b) by 80 days.

(21) Appl. No.: 18/496,471

(22) Filed: Oct. 27, 2023

(65) Prior Publication Data

US 2025/0139277 A1 May 1, 2025

(51) Int. Cl.
*G06F 21/62* (2013.01)
*G06F 21/45* (2013.01)

(52) U.S. Cl.
CPC .......... *G06F 21/6227* (2013.01); *G06F 21/45* (2013.01); *G06F 2221/2113* (2013.01)

(58) Field of Classification Search
CPC .. G06F 21/45; G06F 21/6227; G06F 21/6245; G06F 2221/2113
See application file for complete search history.

(56) References Cited

U.S. PATENT DOCUMENTS 7,743,069 B2 * 6/2010 Chitkara ............. G06F 21/6227 707/999.009
7,797,342 B2 * 9/2010 Banks ................... H04L 9/0894 707/999.009
7,809,142 B2 * 10/2010 Bohush ..................... H04L 9/16 713/193
8,639,947 B2 * 1/2014 Elovici ................. H04L 9/0836 705/52
9,069,987 B2 * 6/2015 Branish, II .......... H04L 63/0428
9,514,169 B2 * 12/2016 Mattsson ............ G06F 21/6227
9,720,943 B2 * 8/2017 Mattsson ............ G06F 21/6227
10,055,444 B2 * 8/2018 Arora .................... G06F 16/248
11,316,658 B2 * 4/2022 Kurian ................ G06F 21/6218

(Continued)

OTHER PUBLICATIONS

Tieming Geng et al., Securing Relational Database Storage with Attribute Association Aware Shuffling 2019, IEEE Conference on Dependable and Secure Computing (DSC), Hangzhou, China, pp. 1-8, doi: 10.1109/DSC47296.2019.8937694, (Nov. 2019) (Year: 2019).*

*Primary Examiner* — Sharon S Lynch
(74) *Attorney, Agent, or Firm* — Lowenstein Sandler LLP

(57) ABSTRACT

A method includes identifying, by a processing device, a data structure including cells to store data, wherein the cells are arranged within rows and columns of the initial data structure. A scrambled data structure is created in which at least a subset of cells of the initial data structure is rearranged such that each cell of the rearranged subset of cells is located in at least one of a different row or a different column of the initial data structure. Responsive to receiving a user request to access the data of the initial data structure, the processing device determines whether to provide the user with access to the initial data structure or the scrambled data structure.

17 Claims, 7 Drawing Sheets

| | 340A | 340B | 340C | 340D | 340N |
|---|---|---|---|---|---|
| 330A | 11111 | E | 33333 | 6 | 33333 |
| 330B | metformin | Hypertension | UTI | OTC acetaminophen | B |
| 330C | 4 | 111111 | 33333 | 3 | citalopgram |
| 330D | trimethoprim-sulfamethoxazole | Diabetes Mellitus Type 2 | sulfonylurea s | A | 2 |
| 330E | 1 | D | C | F | Upper Respiratory Infection |
| 330N | Diabetes Mellitus Type 2 | 22222 | 5 | captopril | Anxiety Disorder |

(56) References Cited

U.S. PATENT DOCUMENTS

| | | | | |
|---|---|---|---|---|
| 11,755,560 | B2 * | 9/2023 | Arora | G06F 16/24524 707/784 |
| 12,079,360 | B2 * | 9/2024 | Aggarwal | G06F 16/221 |
| 2006/0053112 | A1 * | 3/2006 | Chitkara | G06F 16/284 707/999.009 |
| 2008/0033960 | A1 * | 2/2008 | Banks | H04L 9/0894 707/999.009 |
| 2008/0133935 | A1 * | 6/2008 | Elovici | H04L 9/14 713/193 |
| 2008/0317242 | A1 * | 12/2008 | Bohush | H04L 9/16 380/28 |
| 2012/0246696 | A1 * | 9/2012 | Boukobza | G06F 21/6245 726/1 |
| 2014/0101438 | A1 * | 4/2014 | Elovici | G06F 21/602 713/165 |
| 2014/0380051 | A1 * | 12/2014 | Branish, II | H04L 63/0428 713/169 |
| 2015/0089574 | A1 * | 3/2015 | Mattsson | G06F 21/6245 726/1 |
| 2017/0053135 | A1 * | 2/2017 | Mattsson | G06F 21/602 |
| 2017/0177888 | A1 * | 6/2017 | Arora | G06F 16/183 |
| 2019/0034476 | A1 * | 1/2019 | Arora | G06F 21/6227 |
| 2020/0327244 | A1 * | 10/2020 | Blass | G06F 21/6227 |
| 2021/0019434 | A1 * | 1/2021 | Bibliowicz | G06F 21/6218 |
| 2022/0021516 | A1 * | 1/2022 | Kurian | H04L 9/0894 |
| 2022/0253464 | A1 * | 8/2022 | Sloane | G06F 21/6227 |
| 2022/0253545 | A1 * | 8/2022 | Sloane | G06F 21/6245 |
| 2023/0334039 | A1 * | 10/2023 | Arora | G06F 16/2457 |
| 2024/0005016 | A1 * | 1/2024 | Aggarwal | G06F 16/221 |

* cited by examiner

300

340A 340B 340C 340D 340N

| | NAME 312 | ZIP CODE 314 | SSN 316 | DIAGNOSIS 318 | PRESCRIPTION 320 |
|---|---|---|---|---|---|
| 330A | A | 11111 | 1 | Upper Respritory Infection | OTC acetaminophen |
| 330B | B | 22222 | 2 | Hypertension | captopril |
| 330C | C | 33333 | 3 | Diabetes Mellitus Type 2 | sulfonylureas |
| 330D | D | 11111 | 4 | Diabetes Mellitus Type 2 | metformin |
| 330E | E | 33333 | 5 | UTI | trimethoprim-sulfamethoxazole |
| 330N | F | 33333 | 6 | Anxiety Disorder | citalopgram |

| | 340A | 340B | 340C | 340D | 340N |
|---|---|---|---|---|---|
| 330A | 11111 | E | 33333 | 6 | 33333 |
| 330B | metformin | Hypertension | UTI | OTC acetaminophen | B |
| 330C | 4 | 111111 | 33333 | 3 | citalopgram |
| 330D | trimethoprim-sulfamethoxazole | Diabetes Mellitus Type 2 | sulfonylurea s | A | 2 |
| 330E | 1 | D | C | F | Upper Respiratory Infection |
| 330N | Diabetes Mellitus Type 2 | 22222 | 5 | captopril | Anxiety Disorder |

FIG. 3B

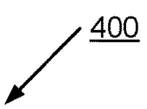

Identify an initial data structure including cells to store data, wherein the cells are arranged within rows and columns of the initial data structure
402

Create a scrambled data structure in which at least a subset of cells of the initial data structure is rearranged such that each cell of the rearranged subset of cells is located in at least one of a different row or a different column of the initial data structure
404

Responsive to receiving a user request of a user to access the data of the initial data structure, determine whether to provide the user with access to the initial data structure or the scrambled data structure.
406

FIG. 4

SYSTEMS AND METHODS FOR SCRAMBLING CELLS OF A DATA STRUCTURE

TECHNICAL FIELD

The disclosed implementations relate generally to data privacy tools. More particularly, the disclosed implementations relate to methods, systems, graphical user interfaces, and data structures for providing scrambling cells of a data structure.

BACKGROUND

Data analytics services extract, process, and analyze large volumes of data to discover trends and patterns that can lead to actionable information for an organization.

SUMMARY

The following presents a simplified summary of various aspects of this disclosure in order to provide a basic understanding of such aspects. This summary is not an extensive overview of all contemplated aspects, and is intended to neither identify key or critical elements nor delineate the scope of such aspects. Its purpose is to present some concepts of this disclosure in a simplified form as a prelude to the more detailed description that is presented later.

An aspect of the disclosure provides a system and a computer-implemented methods that includes scrambling cells of a data structure. In an implementation the method includes identifying an initial data structure including cells to store data, wherein the cells are arranged within rows and columns of the initial data structure. The method further includes creating a scrambled data structure in which at least a subset of cells of the initial data structure are rearranged such that each cell of the rearranged subset of cells is located in at least one of a different row or a different column of the rows and columns of the initial data structure. The method further includes responsive to receiving a user request of a user to access the data of the initial data structure, determining whether to provide the user with access to the initial data structure or the scrambled data structure.

In some embodiments, determining whether to provide the user with access to the initial data structure or the scrambled data structure includes determining a user privilege level. In some embodiments, the method further includes providing the user with access to the initial data structure responsive to determining that the user privilege level is a first user privilege level. In some embodiments, the method further includes providing the user with access to the scrambled data structure responsive to determining that the user privilege level is a second user privilege level. In some embodiments, the user privilege level is defined by an administrator of a system hosting the initial data structure.

In some embodiments, the scrambled data structure is stored in a memory in association with the initial data structure. In some embodiments, the subset of cells of the initial data structure is determined by an administrator of a computer system associated with the data structure. In some embodiments, the initial data structure corresponds to a table within a relational database. In some embodiments, the subset of cells of the data structure is rearranged based on one of an irreversible cryptographic algorithm or a reversible cryptographic algorithm according to access controls corresponding to the user.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

FIG. 3A depicts an example of a data structure before scrambling cells of the data structure, in accordance with at least one embodiment of the present disclosure.

FIG. 3B depicts an example of a data structure after scrambling cells of the data structure, in accordance with at least one embodiment of the present disclosure.

FIG. 4 depicts a flow diagram of a method for scrambling cells of a data structure, in accordance with at least one embodiment of the present disclosure.

DETAILED DESCRIPTION

Figure 1:
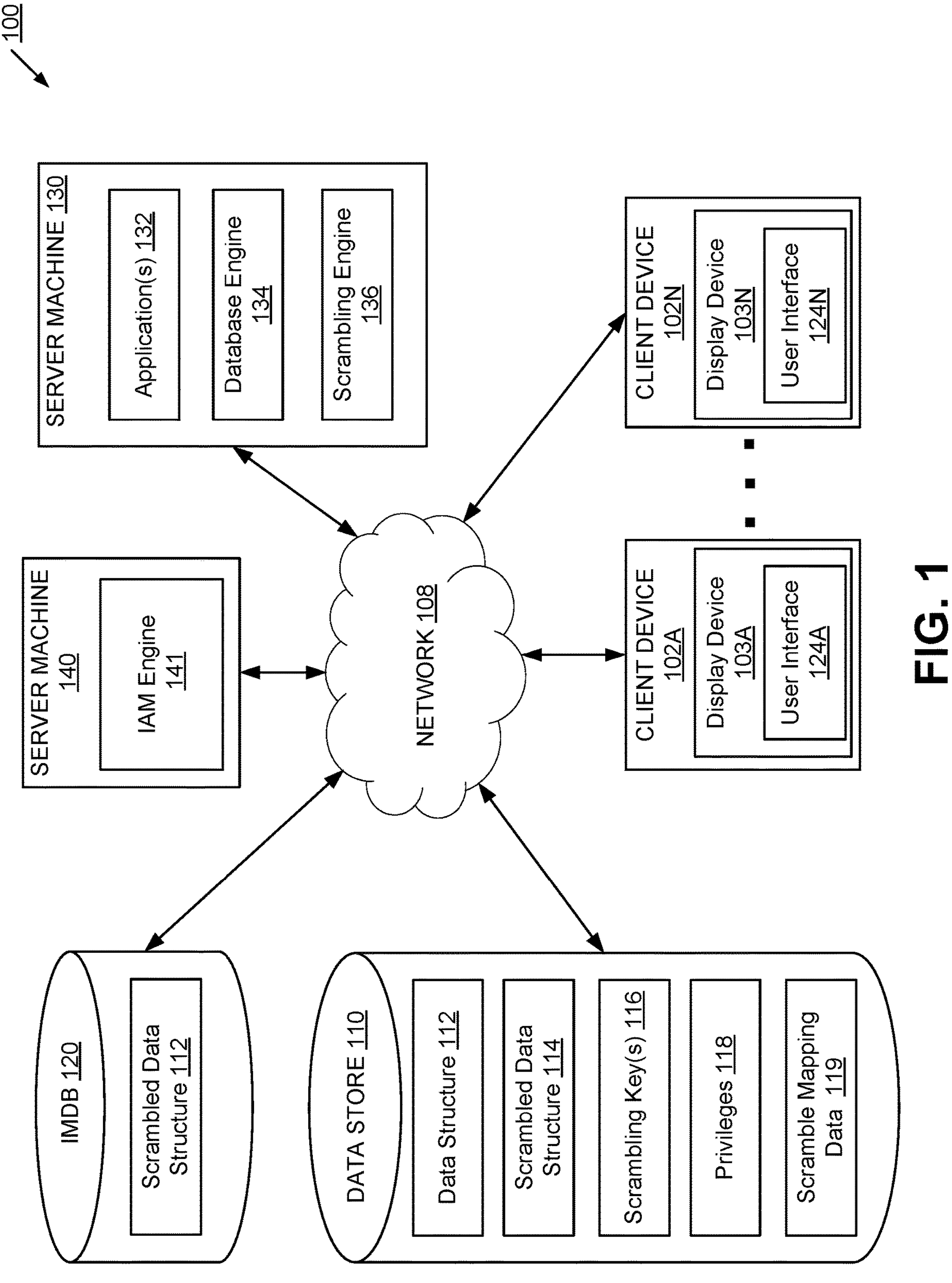
FIG. 1 illustrates an example of system architecture for enabling scrambling cells of a data structure, in accordance with aspects and implementations of the present disclosure.

Data analytics has emerged as a critical field across various domains including finance, healthcare, business, and technology. The field of data analytics has provided such domains with the ability to extract valuable insights, patterns, and trends from large (e.g., thousands or millions of elements) datasets and has enabled organizations to make data-driven decisions, optimize operations, and generally gain advantages over competitors. With the increasing volume and variety of available data, the field of data analytics has experienced rapid growth.

The progression of and increased reliance on data analytics has led to significant security concerns and vulnerabilities. As data analytics has become more sophisticated and data repositories more interconnected, the risks associated with privacy violations have increased proportionally. For example, public health researchers may conduct analysis of diseases, transmission rates, and impacted populations to better inform public policy decisions. Public health researches may be provisioned with access to large datasets collected by multiple health care systems to perform analytic tasks. However, such data may be considered sensitive due to the ability to perform attribution based on the structure of the data. For example, a viewer of the dataset may ascertain information such as country of residence, state, and zip code and attribute such information to a particular person as a result of the relational structure of some databases. Attribution of personal data can raise significant privacy concerns as the misuse or mishandling of personal data can result in regulatory penalties and damage an organization's reputation.

Some current systems may attempt to mitigate privacy concerns by encrypting personal data. While encryption is an effective method to ensure data confidentiality, it can pose challenges to performing meaningful data analysis. When data is encrypted, it becomes unreadable without first decrypting the data. This may render the data essentially useless for purposes of data analytics unless the data is first decrypted, thereby obviating the ability to perform meaningful analysis on data. Additionally, encrypting data can be a compute-intensive process.

In certain instances, some current systems may redact personal data by running a script or through manual effort to protect personal data and prevent attribution of data to a particular person. For example, a system may redact certain columns (attributes) of a database table corresponding to the name of an individual, a column corresponding to the birthdate of the individual, a column corresponding to a resident state of the individual, and a column corresponding to resident zip code of the individual. However, in certain scenarios, it may be desirable for a researcher performing analysis on a database table to perform analysis using the redacted information. Redacting or restricting access to specific columns of a database table can result in a loss of context and valuable information related to the dataset. For example, a public health researcher may wish to track the proliferation of an infectious disease by analyzing health records. However, if a system redacts, encrypts, or restricts access to attributes related to geographical information such as zip code and state before provisioning the health records, the researcher may be unable to accurately analyze cases of a diseases at a local level or a state level. As such, it may be difficult to perform aggregated data analysis.

Aspects and implementations of the present disclosure address the above-mentioned challenges and other challenges by providing systems and methods for scrambling cells of a data structure. In some embodiments, the data structure can be arranged in multiple columns (e.g., attributes) and multiple rows (e.g., records) structured as a table included in a data store such as a relational database. Each column may represent an individual data field or attribute about a record in the data structure. For example, a hospital record database may include a table with columns such as "Name," "Birthdate," "Social Security Number," "Diagnosis," and "Prescription" with an associated data type (e.g., integer, string, date). Each row (e.g., records, tuple, etc.) may represent individual data cells within the table. A system (e.g., a database management system) can implement a set of measures such as access controls (e.g., role-based access controls), authentication services, authorization mechanisms, encryption, and the like to protect data contained within a database.

In at least one embodiment, the system may provide table scrambling as a security service. In an illustrative example, a database management engine can be used to act as intermediary between a user (e.g., an end user) and a database management system. In at least one embodiment, an administrator can define the user's permissions/privileges via an access management tool (also known as identify and access management (IAM) tool). IAM tools can include software, such as applications, configured to manage users' access to certain data. Access can refer to a user's ability to create, view, modify (e.g., update, delete, etc.), download, or perform other operations on data such as data within a database table. The user may request (e.g., via the database application) to view data stored within the database management system. For example, the user may request access to a set of hospital records stored by the database management system. When the user requests access to the data, an IAM service may check the user's IAM privileges to determine the access level for the user. If the user has a sufficient privilege level to access the data, the system can provide the user with access to hospital records table. If the user does not have a sufficient privilege level to access the data, but does have sufficient privilege level to access a scrambled form of the data, the system can scramble the hospital records table and provide the user with access to the scrambled table. To scramble the table, the scrambling service may rearrange cells of the table such that each rearranged cell is arranged in at least one of a different column or a different row. The user may have access to the scrambled data, but the data within the scrambled table may be rearranged such that personal identifiers are disassociated from personal data. As a result, personal data may be anonymous. Thus, meaningful statistical analysis may be performed using the data within the scrambled table while preventing users from attributing data back to a particular person. For example, a health researcher may be able to perform analysis on a scrambled hospital records table to determine hospital admissions due to a given infectious disease (e.g., by determining a number of cells of the scrambled table with an identifier associated with the given infectious disease) while being unable to determine relationships between cells of the scrambled table.

Aspects of the present disclosure result in improved performance of data protection tools. In particular, the aspects of the present disclosure enable data protection tools to scramble cells of a data structure, breaking column and/or row relationships of the data structure and thereby allowing the data protection tools to protect confidential data. Thus, the technical effect may be a more secure data protection system that limits or prevents extraction of data relations associated with a dataset while allowing data analysis to be performed using the dataset. Additionally, protecting data by scrambling fields of a data structure can result in more efficient use of computing resources, by avoiding consumption of computing resources associated with conventional data protection techniques such as encrypting underlying data of a data structure.

FIG. 1 is an example of a system architecture 100 (generally referred to as "system 100" herein) for enabling scrambling cells of a data structure, in accordance with implementations of the disclosure. The system 100 includes client devices 102A through 102N (referred to generally as "client devices 102" herein), a data store 110, an in-memory database 120 (IMDB 120), a server machine 130, and a server machine 140 connected to a network 108. The network 108 may include a public network (e.g., the Internet), a private network (e.g., a local area network (LAN) or wide area network (WAN)), or a combination thereof.

In implementations, network 108 may include a wireless infrastructure, which can be provided by one or more wireless communications systems, such as a wireless fidelity (Wi-Fi) hotspot connected with the network 108 or a wireless carrier system that can be implemented using various data processing equipment, communication towers, etc. Additionally or alternatively, network 1 can include a wired infrastructure (e.g., Ethernet).

In some implementations, data store 110 is a persistent storage that is capable of storing data as well as data structures to tag, organize, and index the data. The data can include a database and associated data structures, in accordance with embodiments described herein. Data store 110 can be hosted by one or more storage devices, such as main memory, magnetic or optical storage-based disks, tapes or hard drives, NAS, SAN, and so forth. In some implementations, data store 110 can be a network-attached file server, while in other embodiments, data store 110 can be some other type of persistent storage such as an object-oriented database, a relational database, a non-relational database, and so forth, that can be hosted by one or more different machines (e.g., the server machines 130 and 140) via network 108.

In some implementations, the data store 110 includes data structure 112, scrambled data structure 114, scrambling key(s) 116, privileges 118, and scrambling mapping data 119. The data structure 112 can define how data is stored, relationship between the data, and how data can be accessed. In some embodiments, the data structure 112 can be organized as collection of key-value pairs, such as a table (e.g., a relational database table), a key-value store, a columnar store, a graph model, and the like. A key is a unique identifier that is used to reference a specific piece of data (e.g., the value) within a data structure. The value is the actual data (e.g., strings, numbers, binary data, JavaScript Object Notation (JSON) objects, etc.) associated with the key. The relationship between the key and the corresponding value forms the key-value pair. In an illustrative example, the data structure 112 may be a table within a relational database management system (RDBMS) such as system 100. A table is organized into rows and columns, where each row represents a record, and each column represents an attribute or a field. Keys may be used to establish relationships between tables in a database. Primary keys may uniquely identify each row in a table while foreign keys may create references to primary keys in other tables, thereby enabling the establishment of relationships between multiple tables of an RDBMS.

Scrambled data structure 114 can represent a version of the data structure 112 in which the cells have been rearranged such that each cell of the scrambled data structure 114 is located in at least one of a different row or a different column than the corresponding cell in the data structure 112. In some embodiments, the scrambled data structure 114 can include a subset of rearranged cells and a subset of cells that are not rearranged. For example, cells with columns A, B, and C of the of the scrambled data structure 114 may be rearranged, while columns D, E, and F are not rearranged. In some embodiments, the scrambled data structure 114 may be produced using an irreversible cryptographic algorithm, such as a hash (e.g., Secure Hash Algorithm 3 (SHA-3, SHA-256, MD5, etc.). In some embodiments, the scrambled data structure 114 may be produced using a reversible cryptographic algorithm, such as a stream cipher (e.g., Rivest Cipher 4 (RC4), ChaCha, Salsa20, etc.) and a key provided by or generated by a user (e.g., an administrator) of the system 100. The key may be used to reverse the cryptographic algorithm used to create the scrambled data structure 114 in order to obtain the data structure 112. In some embodiments, the scrambled data structure 114 may be a copy of the data structure 112 that is then rearranged.

In some embodiments, the scrambled data structure 114 may be omitted from data store 110 and additional data structures may be used to track the rearranged version of the data structure 112. For example, scramble mapping data 119 may maintain a mapping or an index of the rearranged cells of the data structure 112 that associates the new locations of the cells of the data structure 112 with the original locations of the cells. This can allow access to both the data structure 112 and a scrambled version of the data structure 112 without duplicating the dataset and storing the scrambled data structure 114.

Privileges 118 can define permissions or access rights to users, roles, or applications to perform various operations on the data store 110. The privileges 118 can include a SELECT privilege to allow users to read data from specified tables within the data store 110, an INSERT privilege to permit users to add new rows (records) to a specific tables (e.g., data structure 112) within the datastore, an UPDATE privilege to allow specific users to modify (e.g., using SQL statements) existing data within specified data structures of the data store 110, a DELETE privilege to allow users to remove rows (records) from specified structures within the data store 110, and other privileges associated with existing databasing techniques (e.g., CREATE, ALTER, DROP, REVOKE, GRANT, etc.). For example, the privileges 118 can indicate whether a certain user can read data from (e.g., SELECT) one, both, or neither of the data structure 112 and the scrambled data structure 114. The privileges 118 may enforce a principle of least privilege in which users are provided with a minimum level of access necessary to perform their tasks. For example, an administrator of the system 100 may determine that a given user only needs read access to the scrambled data structure 114 to perform their analytic tasks, and update the privileges 118 associated with the given user to prevent the given user from access the data structure 112 and other data stored within the data store 110. An administrator can be a user having system level privileges (also referred to as administrative privileges). As such, an administrator can provide input, via, for example, user interface 124, that used by the system 100 to define privileges 118. For example, application 132 may provide a user interface 124A for display on a client device 102A to allow the administrator to indicate one or more privileges 118 associated with another user of the system. Each user can be associated with an identifier (e.g., user identification (ID)). For example, a user identifier can include a name, a handle, an email address, etc. Each identifier can be associated with one or more privileges 118.

The server machine 140 may include an Identity and Access Management (IAM) engine 141. The IAM engine 141 can generally provide capabilities for managing user identities, privileges (e.g., privileges 118), and authentication with the system 100. In some embodiments, the IAM engine 141 can facilitate (e.g., during onboarding and/or offboarding processes) creation, modification, and deletion of user accounts within the system 100. In some embodiments, the IAM engine can define access control policies that specify which user can access which resources and what actions certain user are allowed to perform. In some embodiments, the IAM engine can support role-base access controls by assigning users to roles and roles to privileges 118. For example, an administrator can provide input to define Role A as including access privileges 118 to data structure 112 and Role B as including access privileges 118 to scrambled data structure 114. The administrator can then provide additional input to cause Role A to be assigned to a first user and Role B to be assigned to a second user. Thus, each user may have access to particular data or particular formats of data within the data store 110.

The server machine 130 may include application(s) 132, a database engine 134, and a scrambling engine 136. In some embodiments, server machine 130 can host an application 132 that provides a user interface (UI) 124 (referred to generally as "UI(s) 124 herein) for presentation on the client device 102. For example, the UI 124 can be presented via a web browser (not shown). Alternatively, the client device 102 includes a local (mobile or desktop) application 132 that provides UI 124 and communicates with the IAM Engine 141 and/or Scrambling Engine via network 108. In some implementations, the application 132 (e.g., mobile application, desktop application, server-based application, etc.) can provide, for presentation on a display device 103A-103N, the UI 124 for users to interact with a data store (e.g., a database of data store 110). The UI 124 may serve as a front-end through which users interact with and manipulate data stored within the data store 110. The UI 124 may include a graphical user interface (GUI), a wed-based interface, a command-line interface, a mobile application interface, and the like. The application 132 can provide the UI 124 to simplify the user process of access, querying, manipulating, and viewing data stored within the data store 110.

Database engine 134 may be a component of server machine 130 responsible for efficiently storing, managing, retrieving, and manipulating data within a database of data store 110. The database engine 134 may serve as intermediary between application 132 and the database. In some embodiments, the database engine 134 can provide functionality such as data storage, data security, concurrency control, transaction management, indexing, data backup and recovery, query processing, and the like. In some embodiments, the database engine 134 may include an application programming interface (API) to allow users to interact with the database engine 134 without interacting with the UI 124 provided by the application 132.

Scrambling engine 136 can generate a scrambled data structure (e.g., scrambled data structure 112), which may be provided for display within a user interface 124 and maintained within the data store 110. As mentioned above, the scrambled data structure 114 can be produced by rearranging cells of the data structure 112 such that each cell of the scrambled data structure 114 is located in at least one of a different row or a different column than the corresponding cell in the data structure 112. In some embodiments, the scrambling engine 136 can generate the scrambled data structure 112 using various cryptographic ciphers. For example, a secure scrambling key 116 can be generated or provided by an administrator of the system 100. The scrambling engine 136 can use the cipher to generate a pseudo random sequence of numbers that may determine the order in which cells of the data structure 112 will be rearranged. For example, the pseudorandom sequence of numbers generated by the cipher can be used as indices to shuffle cells of the table. For each index in the sequence of numbers, the corresponding cell of the list can be swapped with the current cell of the list. A user can provide (e.g., via a client device 102) the scrambling key 116 as input into the system 100 to cause the system 100 to reverse (e.g., using scramble mapping data 119) the scrambling operation performed on the scrambled data structure 114 and obtain an unscrambled data structure. It is appreciated that the scrambling engine 136 can utilize various shuffling techniques to generate the scrambled data structure 112, such as including, but not limited to, Fisher-Yates shuffle, random sampling, sorting with random keys, standard library functions, or any combination therefore. Additionally, scrambling engine 136 can utilize both random and deterministic methods to rearrange cells and generate a scrambled data structure 112.

In some embodiments, the in-memory database (IMDB) 120 can store the scrambled data structure 112. The IMDB 120 is a persistent storage that is capable of storing data as well as data structures to tag, organize, and index the data. The data can include a database and associated data structures, in accordance with embodiments described herein. IMDB can be main memory hosted by one or more volatile and/or nonvolatile memory devices such as Dynamic Random-Access Memory (DRAM), Static Random-Access Memory (SRAM), Read-Only Memory (ROM), and the like. In some embodiments, scrambling engine 136 may scramble the data structure 112 on read (e.g., when the data is returned to the user on user request). In such an implementation, the scrambled data structure 114 may temporarily be stored within the IMDB 120 prior to being returned to the requesting user.

In some implementations, a user can initiate a session of application 132 on client device 102A. A session of the application 132 can correspond to an interaction between a user's client device 102 and a DBMS (e.g., database engine 134) for a period of time, and can include a sequence of communications between a session start event and a session end event. The session start event can be triggered by the user providing credentials, such as a username as password (e.g., user login), to the application 132 and executing a query. The application 132 can maintain a session state, which includes information about the user's identify, privileges, and preferences to ensure the DBMS can provide context-aware responses to user queries. The session end event can be triggered by the user logging out (e.g., a user logout). A user logout can occur automatically (e.g., based on network conditions or lack of user interaction with the application) or in response to a user request.

In some implementations, server machines 130 and 140 may operate on one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to enable a user to access data store 110. In some implementations, the functions of server machines 130 and/or 140 may be provided by a fewer number of machines. For example, in some implementations, components and/or modules of any of server machines 130 and 140 can be integrated into a single machine, while in other implementations components and/or modules of any of server machines 130 and 140 can be integrated into multiple machines. In general, functions described in implementations as being performed by any of server machines 130 and 140 can also be performed on the client devices 102A-N in other implementations. In addition, the functionality attributed to a particular component can be performed by different or multiple components operating together.

The client devices 102A through 102N can include one or more processing devices communicatively coupled to memory devices and I/O devices. The client devices 102A through 102N can be desktop computers, laptop computers, tablet computers, mobile phones (e.g., smartphones), or any suitable computing device. The client devices 102A through 102N can include components, such as an input device and an output device. A user can be authenticated by the server machine 130 and/or server machine 140 using a username and password (or other identification information) provided by a user via the user interface 124A-124N, such that the same client device 102A-102N can be used by different users at different times.

Further to the descriptions above, a user may be provided with controls allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

Figure 2:
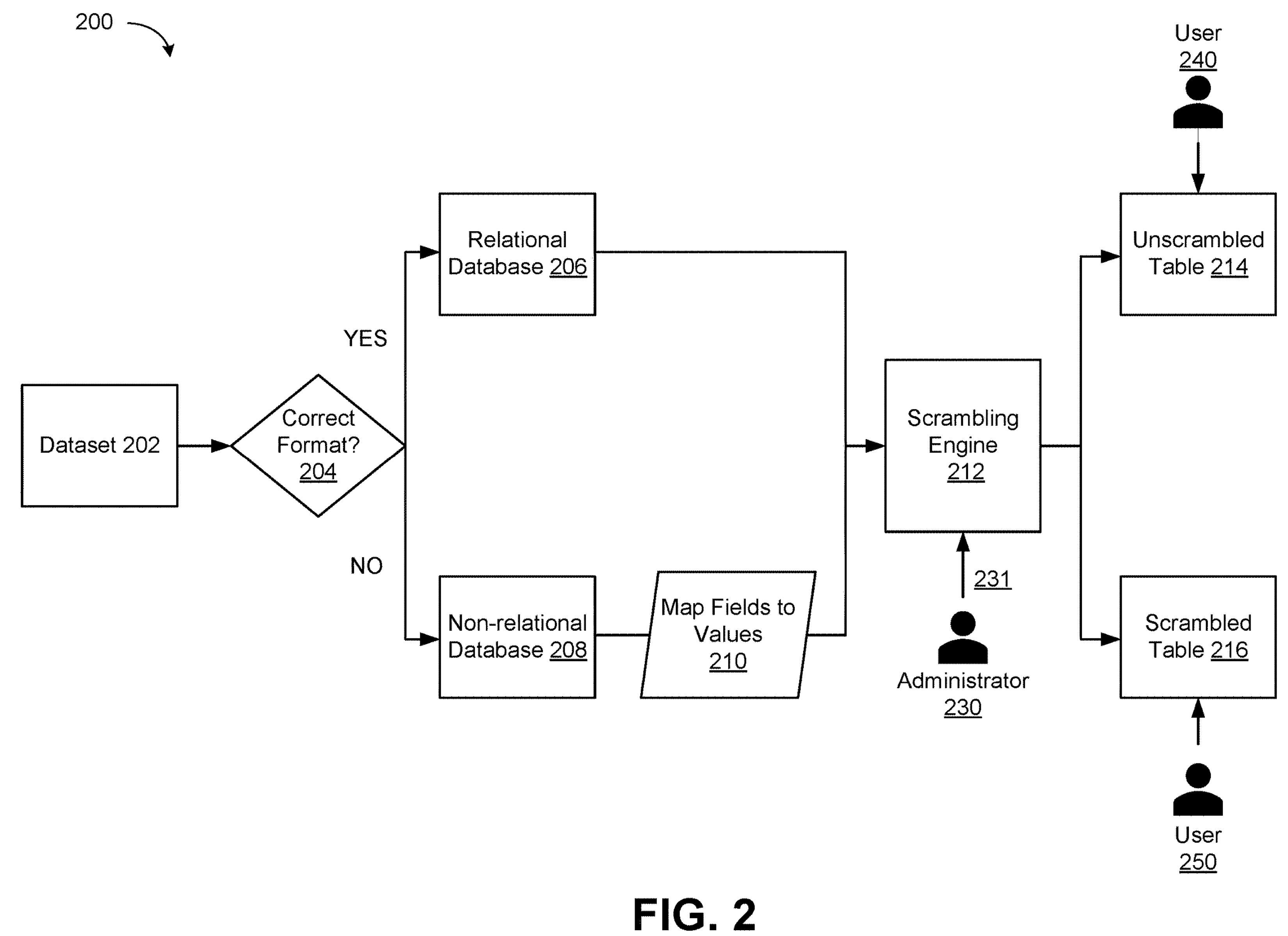
FIG. 2 is a diagram illustrating an example of scrambling cells of a data structure, in accordance with at least one embodiment of the present disclosure.

FIG. 2 is a diagram illustrating an example method 200 of scrambling cells of a data structure, in accordance with at least one embodiment of the present disclosure. The method 200 can be performed by processing logic that can include hardware (e.g., circuitry, dedicated logic, programmable logic, microcode, etc.), software (e.g., instructions run on a processing device to perform hardware simulation), firmware, or any combination thereof. In one embodiment, the method 200 can be performed by one or more components of the system 100 of FIG. 1. For example, one or more operations of the method 200 can be performed by a scrambling engine 136 of FIG. 1.

The method 200 begins by identifying a dataset 202. In some embodiments, a client application (e.g., application 132 of FIG. 1) can initiate a request (e.g., via a client device of FIG. 1) to access dataset 202 stored in a database, such as data store 110 of FIG. 1. The request can be initiated using a database query, an Application Programming Interface (API) call, or the like. In some embodiments, the dataset 202 may be a structured dataset. A structured dataset may refer to an organized dataset 202 that adheres to a consistent schema with key value pairs. A key value pair includes a unique identifier (key) used to reference associated data (value(s)). For example, a structured dataset can include a relational database, spreadsheets, Comma-Separated Values (CSV) files, key value stores, columnar stores graph databases, and the like.

In some embodiments, the dataset 202 may be a dataset with greater than a threshold number of records/datapoints. In some embodiments, a developer may define the threshold number (e.g., via client device) that provides that data sets with lesser than the threshold number of records/datapoints should not be scrambled. For example, a developer may define the threshold number to be 1,000 records/datapoints. If processing logic determines that there are greater than 1,000 records/datapoints, the method continues to operation 204. If the processing logic determines there are lesser than 1,000 records/datapoints, the method ceases. The threshold number of records/datapoints may be determined based on a statistical likelihood that an adversary is capable of reversing a scrambling operation to obtain the original mapping of the data within the dataset. With a smaller (e.g., less than 1,000 elements) dataset 202, there may be a limited number of possible permutations to rearrange the data. In contrast, with a larger (e.g., greater than 1,000 elements) dataset 202, there number of possible permutations grows exponentially, making it much more challenging (if not impossible) to reverse the scrambling operation.

At operation 204, processing logic may determine whether the dataset 202 is in the correct format. The correct format can be a relational database 206 format. A relational database format can refer to an organization of the dataset 202 in a relational database management system (RDBMS). In an RDBMS, data is organized into tables, where each table represents a specific entity. Each table of an RDBMS can include rows and columns, where each row represents a record or an entry within the table represents a field or an attribute of the data. If the dataset 202 is in a relational database 206 format, the relational database 206 can provided as input to the scrambling engine 212. If the dataset 202 is a non-relational database 208 format, the method 200 can continue to operation 210.

At operation 210, processing logic may map fields of the non-relational database 208 to values in a tabular format. For example, a key the non-relational database 208 may be "Names" with two corresponding values of "John Doe" and "Jane Doe". Mapping fields of the non-relational database 208 can include designating the key "Names" as a column (field) of a table and designating "John Doe" and "Jane Doe" as rows (entries) corresponding to the "Names" column. The non-relational database 208 may include a key value store, a columnar store, a graph database, and the like.

The scrambling engine 212 can receive one of the relational database 206 table or the non-relational database 208 organized in a tabular format. In both instances, the scrambling engine 212 can perform a scrambling operation on the received database table to rearrange cells of the database table such that each of the cells is located in at least one of a different row or a different column of the database table in order to generate a scrambled table 216. In some embodiments, the scrambling engine 212 can rearranged a subset of cells of the received database table, as illustrated below with respect to FIG. 3C.

In some embodiments, the scrambling engine 212 may perform an irreversible scrambling operation such that cells of the scrambled table 216 may not be mapped back to the unscrambled database table. For example, the scrambling engine 212 may iterate through each cell of the database table and use a hashing function (e.g., Message Digest 5 (MD5), Secure Hash Algorithm 1 (SHA-1), SHA-256, SHA-3, etc.) to compute a hash of each of the contained in each of the cells. The hash of the data is used to determine where the corresponding cell will be moved. The rearranging of the cells of the database table may be performed randomly or deterministically.

In some embodiments, the scrambling engine 212 may perform a reversible scrambling operation such that scrambling operation may be reversed to obtain the data in an unscrambled format. In some embodiments, the scrambling engine 212 may perform the scrambling operation using a cryptographic cipher and a scrambling key. An administrator 230 may provide the scrambling key to the scrambling engine 212 or the scrambling key can be generated using a random number generator, such as a cryptographically secure random number generator. In an illustrative example, the scrambling engine 212 can use the scrambling key to seed (e.g., set an initial state) for a random number generator (RNG). The scrambling engine 212 can use the seeded RNG to perform the scrambling operation. In some embodiments, the scrambling engine 212 can store (e.g., within data store 110 of FIG. 1) a mapping data structure containing a mapping (e.g., scramble mapping data 119 of FIG. 1) between original indices of cells of the original database table and indices of cells of the scrambled table 216. The scrambling engine 212 can use the mapping data structure to reverse the scrambling operation a produce an unscrambled data structure. In some embodiments, a user may input (e.g., via a UI of client device) the scrambling key to obtain the unscrambled data structure from a DBMS. In some embodiments, a user with sufficient privileges may insert new data into the scrambled table 216. When new data is inserted, the mapping data structure may be used in conjunction with the new data to create a scramble on the existing scrambled table 216 that ensure new data is properly inserted into the pre-existing scrambled table 216.

In some embodiments, the scrambling engine 212 can dynamically (e.g., for each read request) perform the scrambling operation on the received table. To dynamically scramble a database table, the scrambling engine 212 may retrieve the dataset 202 from storage (e.g., data store 110 of FIG. 1) and perform a scrambling operation on the corresponding table (e.g., the dataset 202 in tabular format). The scrambled table can be temporarily stored in a memory (e.g., IMDB 120 of FIG. 1) which can retrieved by a front end (e.g., application 132 of FIG. 1) of the database management system. The scrambling engine 212 may perform a scrambling operation on each occasion a user requests access to the dataset 202. Accordingly, the scrambling engine 212 can apply a different type of scrambling operation, or the scrambling operation can be nondeterministic such that a different scrambled table 216 may be returned for each request to access the dataset 202.

In some embodiments, the scrambling engine 212 can perform a static (e.g., deterministic or fixed) scrambling operation on the received database table. To statically scramble the database table, the dataset 202 may be retrieved from memory and, if not in the correct format, mapped to a database table format. The scrambling engine 212 may perform a scrambling operation on the database table and store the scrambled table 216 in storage (e.g., data store 110 of FIG. 1). For future requests to view the dataset 202, the scrambled table 216 may be retrieved directly from storage and returned to a requesting user. Accordingly, the scrambling engine 212 may return the same scrambled table 216 for each user request to access the dataset 202.

In some embodiments, the scrambling engine 212 can perform the scrambling operation on read. For example, when a user request access, the scrambling engine 212 can generate a scrambled table and store the scrambled table in temporary memory location (e.g., IMDB 120 of FIG. 1) and/or a persistent storage (e.g., data store 110 of FIG. 1). The scrambled table can then be provided to the requesting user. For each subsequent access request, the scrambling engine 212 can generate a scrambled table and the return the scrambled table to the requesting user. Accordingly, each request user may have access to a different scrambled table.

In some embodiments, the scrambling engine 212 can perform the scrambling operation on write. For example, when a user requests access, the scrambling engine 212 can generate a scrambled table and store the scrambled table in storage (e.g., data store 110 of FIG. 1). For each subsequent access request, the scrambled table can be retrieved from storage and provided to the requesting user. Accordingly, each requesting user may have access to the same scrambled data table. In some embodiments, the scrambling engine 212 may periodically (e.g., every ten minutes) operate a task to pull the dataset 202 from memory, scramble the dataset 202, and store the scrambled table 216 such that the dataset 202 is perpetually in a scrambled state.

The scrambling engine 212 may scramble the database table according to the above-described methodologies based on scrambling algorithm inputs 231 (referred to generally as "inputs" herein) provided (e.g., via a client device) by an administrator 230. In some embodiments, the inputs 231 may include a scrambling key and an indication of a scrambling algorithm to be used to perform the scrambling operation. In some embodiments, the inputs 231 may include the type of scrambling operation to be performed. For example, the administrator 230 may indicate whether to use a reversible scrambling operation or an irreversible scrambling operation and/or whether to dynamically (e.g., for each read request) scramble or statically (e.g., on write) scramble the database table.

In some embodiments, the administrator 230 may define Identity and Access Management (IAM) privileges/permissions through an IAM service, such as provided via IAM engine 141 of FIG. 1. The administrator 230 may utilize the IAM service to specify which users can access which resources and what actions certain users are allowed to perform. In some embodiments, the administrator 230 can define privileges that enable some users to access the unscrambled table 214 and other user to access the scrambled table 216. For example, the administrator 230 can define specific permissions or privileges to enable the user 240 to access the unscrambled table 214. When the user 240 requests to view the dataset 202, the unscrambled table 214 may be provided to the user 240. Further to the above, the administrator 230 can define specific permissions or privileges to enable the user 250 to access the scrambled table 216. When the user 240 requests to view the dataset 202, the scrambled table 216 may be provided to the user 240. In an illustrative example, the administrator 230 may use the IAM service to grant privileges to a particular user that enable the user to perform operations on both a scrambled data structure and an unscrambled data structure. This can include, but is not limited to, data analysis, table creation, modification, etc.

FIG. 3A depicts an example of a data structure 300 before scrambling cells of the data structure, in accordance with at least one embodiment of the present disclosure. As illustrated by FIG. 3A, data structure 300 is an example table of medical records that includes one or more rows 330A-330N (referred to generally as "row(s) 330" herein) and one or more columns 340A-340N (referred to generally as "column(s) 340" herein). Each row 330 may be an entry or a record within the data structure 300. Each row 330 can include a name field 312, a zipcode field 314, a social security number (SSN) field 316, a diagnosis field 318, and a prescription field 320. Name field 312 can include a name of a hospital patient. Zipcode field 314 can include a zip code associated with an address of a particular patient. SSN field 316 can include an SSN corresponding to the patient. Diagnosis field 318 can include an identification of a medical condition associated with the patient during a particular visit. Prescription field 320 can include identification of medicine authorized as a result of the diagnosis. Each row 330 a record or instances within the data structure 300, and each column 340 may represent a specific associated with the record. For example, row 330A may represent a hospital record for an individual "A" including the individual's name, zipcode, SSN, diagnosis, and prescription. The data structure 300 may include multiple cells arranged in rows and columns, where each cell is an individual intersection point of a row and a column. In some embodiments, a scrambling service, such a scrambling engine 136 of FIG. 1 or scrambling engine 212 of FIG. 2, can rearrange cells of the data structure 300 such that each cell is moved to an intersection of one or both of a different row column 330 or column 340, as illustrated below with respect to FIG. 3B.

FIG. 3B depicts an example of a scrambled data structure 301 after scrambling cells of the data structure 300, in accordance with at least one embodiment of the present disclosure. After scrambling cells of the data structure 300, each cell of the scrambled data structure 301 is located within at least one of a different column or a different row. Accordingly each row 330 is disassociated from a particular individual and each column is disassociated from a particular attribute. Personal data is thereby by obfuscated through disassociation of the rows 330 from records and columns 340 from specific fields. Nevertheless a data analyst may still perform aggregated data analysis using the disassociated data within the scrambled data structure 301. For example, scrambled data structure 301 may correspond to a set of records of a particular hospital. A health researcher may be able to determine the number of patients admitted to the particular hospital from particular zip codes, but may be unable to determine which patients correspond to which zip codes. Additionally, the health reaches may determine the number of patients diagnosed with an anxiety disorder at the particular hospital.

Figure 3C:
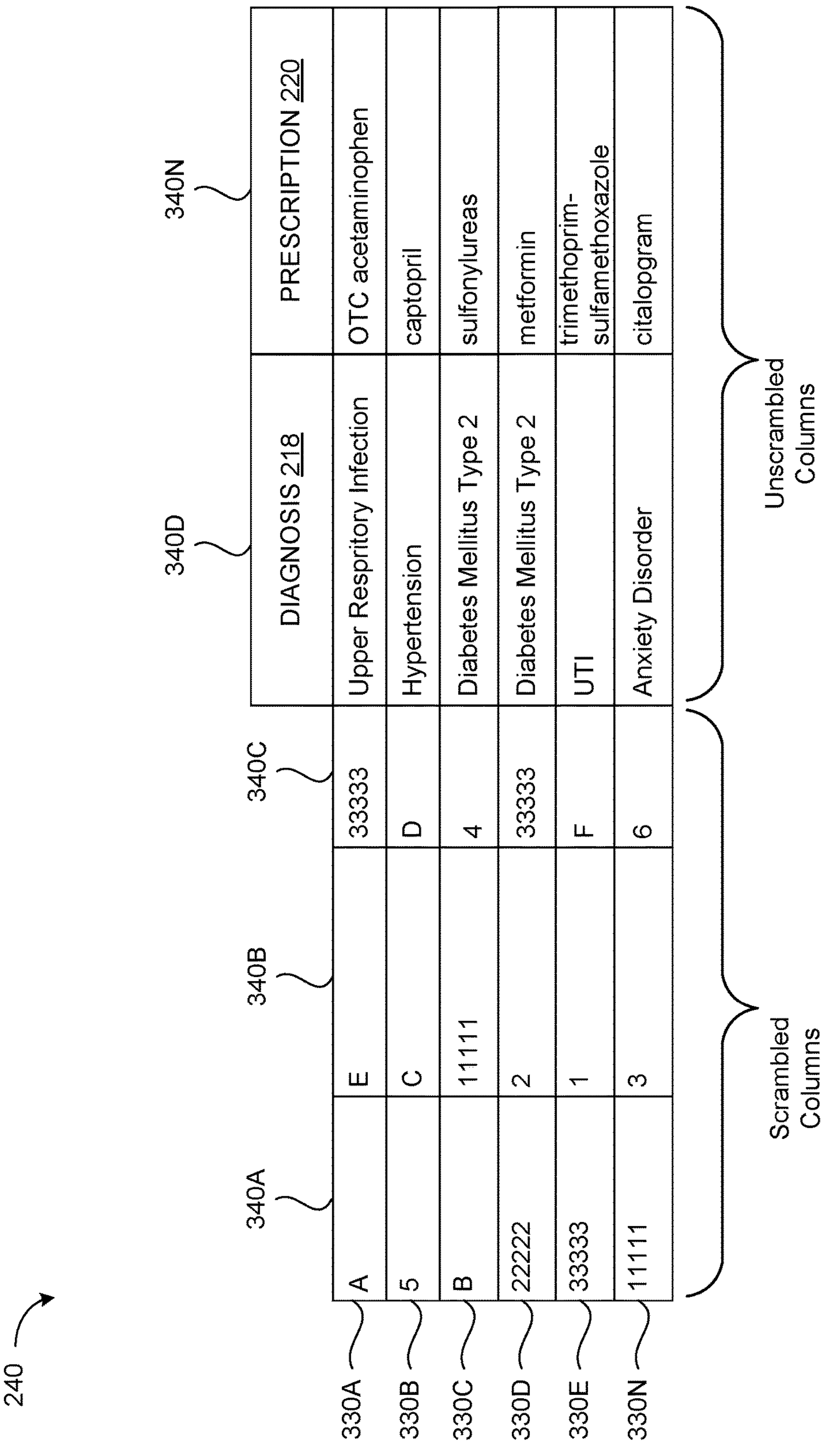
FIG. 3C depicts an example of a data structure after scrambling a portion of the cells of the data structure, in accordance with one embodiment of the present disclosure.

FIG. 3C depicts an example of a partially scrambled data structure 302 after scrambling a portion of the cells of the data structure 300, in accordance with one embodiment of the present disclosure. In the illustrated example, the cells columns 340A, 340B, and 340 are scrambled while the cells of the 340D and 340N are not scrambled. Accordingly, more robust analysis may be performed using that data columns 340D-340N and aggregated analysis may be performed using data within columns 340A-340C while still obfuscation personal data such as names, zip codes, and SSNs. For example, a health researcher may be able to determine patterns between diagnosis 218 and prescriptions 220 using the partially scrambled data a structure 302 while the personal information of the individuals associated with the diagnosis 218 and prescription 220 is scrambled and, therefore, obfuscated. Nevertheless, a health researcher may still be able to perform aggregated data analysis on the scrambled columns of the partially scrambled data structure 302. For example, the health researcher may be able to determine the number of patients admitted to the particular hospital from particular zip codes, but may be unable to determine which patients correspond to which zip codes.

FIG. 4 depicts a flow diagram of a method 400 for scrambling cells of a data structure, in accordance with at least one embodiment of the present disclosure. Method 400 may be performed by processing logic that may include hardware (circuitry, dedicated logic, etc.), software (e.g., instructions run on a processing device), firmware, and/or a combination thereof. In one implementation, some or all the operations of method 400 may be performed by one or more components of system 100 of FIG. 1 (e.g., server machine 130, server machine 140, scrambling engine 136, etc.).

For simplicity of explanation, the method 400 of this disclosure is depicted and described as a series of acts. However, acts in accordance with this disclosure may occur in various orders and/or concurrently, and with other acts not presented and described herein. Furthermore, not all illustrated acts may be required to implement the method 400 in accordance with the disclosed subject matter. In addition, those skilled in the art will understand and appreciate that the method 400 could alternatively be represented as a series of interrelated states via a state diagram or events. Additionally, it should be appreciated that the method 400 disclosed in this specification are capable of being stored on an article of manufacture (e.g., a computer program accessible from any computer-readable device or storage media) to facilitate transporting and transferring such method to computing devices. The term "article of manufacture," as used herein, is intended to encompass a computer program accessible from any computer-readable device or storage media.

At block 402, processing logic identifies an initial data structure, such as data structure 112 of FIG. 1, including cells to store data. The cells are arranged within rows and columns of the initial data structure. In some embodiments, the initial data structure corresponds to a table within a relational database.

At block 404, processing logic creates a scrambled data structure, such as scrambled data structure 114 of FIG. 1, in which at least a subset of cells of the initial data structure is rearranged such that each cell of the rearranged subset of cells is located in at least one of a different row or a different column of the initial data structure. In some embodiments, processing logic stores the scrambled data structure in a memory in association with the initial data structure. In some embodiments, the subset of cells of the initial data structure to be rearranged is determined by an administrator of a computer system associated with the data structure. In some embodiments, the subset of cells of the data structure is rearranged based on one of an irreversible cryptographic algorithm or a reversible cryptographic algorithm according to access controls corresponding to the user.

At block 406, responsive to reception of a user request of a user to access the data of the initial data structure, processing logic determines whether to provide the user with access to the initial data structure or the scrambled data structure processing logic. In some embodiments, to determine whether to provide the user with access to the initial data structure or the scrambled data structure, processing logic determines a user privilege level. In some embodiments, the processing logic provides the user with access to the initial data structure responsive to a determination that the user privilege level is a first user privilege level. In some embodiments, the processing logic provides the user with access to the scrambled data structure responsive to a determination that the user privilege level is a second user privilege level (e.g., which is lower than the first user privilege level). In some embodiments, the use privilege level is defined by an administrator of a system hosting the initial data structure.

Figure 5:
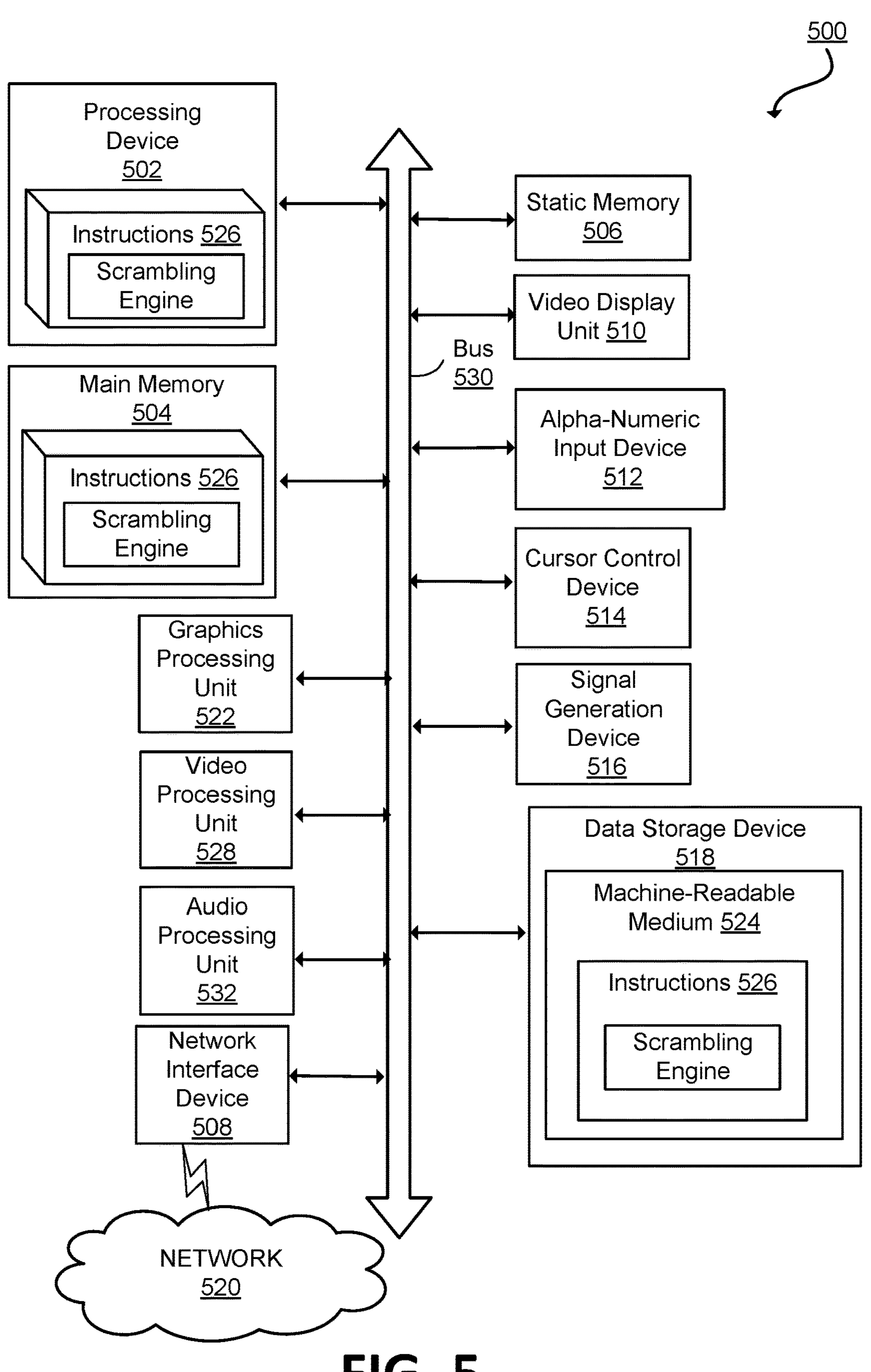
FIG. 5 depicts a block diagram of an example computing device operating in accordance with at least embodiment of the present disclosure.

FIG. 5 illustrates an example machine of a computer system 500 within which a set of instructions, for causing the machine to perform any one or more of the methodologies discussed herein, can be executed, in accordance with aspects and implementations of the present disclosure. The computer system 500 can be server machines 130-140 or client devices 102A-N of FIG. 1. In alternative implementations, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random-access memory (DRAM) such as synchronous DRAM (SDRAM), a static memory 506 (e.g., flash memory, static random-access memory (SRAM), etc.), and a data storage device 518, which communicate with each other via a bus 530.

Processing device 502 represents one or more processors such as a microprocessor, a central processing unit, or the like. More particularly, the processing device can be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 can also be one or more special-purpose processing devices such as an application specific integrated circuit (ASIC), a field programmable gate array (FPGA), a digital signal processor (DSP), network processor, or the like. The processing device 502 can be configured to execute instructions 526 for performing the operations and steps described herein.

The computer system 500 can further include a network interface device 508 to communicate over the network 520. The computer system 500 also can include a video display unit 510 (e.g., a liquid crystal display (LCD) or a cathode ray tube (CRT)), an alphanumeric input device 512 (e.g., a keyboard), a cursor control device 514 (e.g., a mouse), a graphics processing unit 522, a signal generation device 516 (e.g., a speaker), graphics processing unit 522, video processing unit 528, and audio processing unit 532.

The data storage device 518 can include a machine-readable storage medium 524 (also known as a non-transitory computer readable storage medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media.

In some implementations, the instructions 526 include instructions to implement functionality corresponding to the present disclosure. While the machine-readable storage medium 524 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine, allowing the machine and the processing device 502 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm can be a sequence of operations leading to a desired result. The operations are those requiring physical manipulations of physical quantities. Such quantities can take the form of electrical or magnetic signals capable of being stored, combined, compared, and otherwise manipulated. Such signals can be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus can be specially constructed for the intended purposes, or it can include a computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems can be used with programs in accordance with the teachings herein, or it can prove convenient to construct a more specialized apparatus to perform a similar sequence of procedures. In addition, the present disclosure is not described with reference to any particular programming language and any one in use in such computer systems can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications can be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

Reference throughout this specification to "one implementation," or "an implementation," means that a particular feature, structure, or characteristic described in connection with the implementation is included in at least one implementation. Thus, the appearances of the phrase "in one implementation," or "in an implementation," in various places throughout this specification can, but are not necessarily, referring to the same implementation, depending on the circumstances. Furthermore, the particular features, structures, or characteristics can be combined in any suitable manner in one or more implementations.

To the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), software, a combination of hardware and software, or an entity related to an operational machine with one or more specific functionalities. For example, a component can be, but is not limited to being, a process running on a processor (e.g., digital signal processor), a processor, an object, an executable, a thread of execution, a program, and/or a computer. By way of illustration, both an application running on a controller and the controller can be a component. One or more components can reside within a process and/or thread of execution and a component can be localized on one computer and/or distributed between two or more computers. Further, a "device" can come in the form of specially designed hardware; generalized hardware made specialized by the execution of software thereon that enables hardware to perform specific functions (e.g., generating interest points and/or descriptors); software on a computer readable medium; or a combination thereof.

The aforementioned systems, engines, modules, and so on have been described with respect to interact between several components and/or blocks. It can be appreciated that such systems, engines, components, blocks, and so forth can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components can be combined into a single component providing aggregate functionality or divided into several separate sub-components, and any one or more middle layers, such as a management layer, can be provided to communicatively couple to such sub-components in order to provide integrated functionality. Any components described herein can also interact with one or more other components not specifically described herein but known by those of skill in the art.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Finally, implementations described herein include collection of data describing a user and/or activities of a user. In one implementation, such data is only collected upon the user providing consent to the collection of this data. In some implementations, a user is prompted to explicitly allow data collection. Further, the user can opt-in or opt-out of participating in such data collection activities. In one implementation, the collect data is anonymized prior to performing any analysis to obtain any statistical patterns so that the identity of the user cannot be determined from the collected data.

The methods and illustrative examples described herein are not inherently related to any particular computer or other apparatus. Various general purpose systems can be used in accordance with the teachings described herein, or it can prove convenient to construct more specialized apparatus to perform method 400 and/or each of its individual functions, routines, subroutines, or operations. Examples of the structure for a variety of these systems are set forth in the description above. The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:

identifying an initial data structure storing data comprising a plurality of personal data records each associated with a corresponding unique personal identifier of a plurality of personal identifiers, wherein the initial data structure comprises a plurality of cells arranged within a plurality of rows and a plurality of columns of the initial data structure;

creating a scrambled data structure in which each of the plurality of personal data records is disassociated from the corresponding unique personal identifier by rearranging each personal data record to a different row than a row containing the corresponding unique personal identifier in the initial data structure, and wherein the rearranging further comprises rearranging at least a subset of cells of the plurality of cells of the initial data structure such that each cell of the at least a subset of cells is located in a different column of the plurality of columns of the initial data structure; and responsive to receiving a user request of a user to access the data of the initial data structure, determining, based on a user privilege level of the user, whether to provide the user with access to the initial data structure or the scrambled data structure, wherein a different user privilege level is required to provide the user with access to the initial data structure than to provide the user with access to the scrambled data structure.

2. The method of claim 1, further comprising, providing the user with access to the initial data structure responsive to determining that the user privilege level is a first user privilege level.

3. The method of claim 1, further comprising, providing the user with access to the scrambled data structure responsive to determining that the user privilege level is a second user privilege level.

4. The method of claim 1, wherein the user privilege level is defined by an administrator of a system hosting the initial data structure.

5. The method of claim 1, wherein the scrambled data structure is stored in a memory in association with the initial data structure.

6. The method of claim 1, wherein the subset of cells of the initial data structure is determined by an administrator of a computer system associated with the initial data structure.

7. The method of claim 1, wherein the initial data structure corresponds to a table within a relational database.

8. The method of claim 1, wherein the subset of cells of the initial data structure is rearranged based on one of an irreversible cryptographic algorithm or a reversible cryptographic algorithm according to access controls corresponding to the user.

9. A system comprising:

a memory device; and a processing device coupled to the memory device, the processing device to perform operations comprising:

identifying an initial data structure storing data comprising a plurality of personal data records each associated with a corresponding unique personal identifier of a plurality of personal identifiers, wherein the initial data structure comprises a plurality of cells arranged within a plurality of rows and a plurality of columns of the initial data structure;

creating a scrambled data structure in which each of the plurality of personal data records is disassociated from the corresponding unique personal identifier by rearranging each personal data record to a different row than a row containing the corresponding unique personal identifier in the initial data structure, and wherein the rearranging further comprises rearranging at least a subset of cells of the plurality of cells of the initial data structure such that each cell of the at least a subset of cells is located in a different column of the plurality of columns of the initial data structure; and responsive to receiving a user request of a user to access the data of the initial data structure, determining, based on a user privilege level of the user, whether to provide the user with access to the initial data structure or the scrambled data structure, wherein a different user privilege level is required to provide the user with access to the initial data structure than to provide the user with access to the scrambled data structure.

10. The system of claim 9, the operations further comprising, providing the user with access to the initial data structure responsive to determining that the user privilege level is a first user privilege level.

11. The system of claim 9, the operations further comprising, providing the user with access to the scrambled data structure responsive to determining that the user privilege level is a second user privilege level.

12. The system of claim 9, wherein the user privilege level is defined by an administrator of a system hosting the initial data structure.

13. The system of claim 9, wherein the scrambled data structure is stored in a memory in association with the initial data structure.

14. The system of claim 9, wherein the subset of cells of the initial data structure is determined by an administrator of a computer system associated with the initial data structure.

15. The system of claim 9, wherein the initial data structure corresponds to a table within a relational database.

16. The system of claim 9, wherein the subset of cells of the initial data structure is rearranged based on one of an irreversible cryptographic algorithm or a reversible cryptographic algorithm according to access controls corresponding to the user.

17. A non-transitory computer readable storage medium comprising instructions for a server that, when executed by a processing device, cause the processing device to perform operations comprising:

identifying an initial data structure storing data comprising a plurality of personal data records each associated with a corresponding unique personal identifier of a plurality of personal identifiers, wherein the initial data structure comprises a plurality of cells arranged within a plurality of rows and a plurality of columns of the initial data structure;

creating a scrambled data structure in which each of the plurality of personal data records is disassociated from the corresponding unique personal identifier by rearranging each personal data record to a different row than a row containing the corresponding unique personal identifier in the initial data structure, and wherein the rearranging further comprises rearranging at least a subset of cells of the plurality of cells of the initial data structure such that each cell of the at least a subset of cells is located in a different column of the plurality of columns of the initial data structure; and responsive to receiving a user request of a user to access the data of the initial data structure, determining, based on a user privilege level of the user, whether to provide the user with access to the initial data structure or the scrambled data structure, wherein a different user privilege level is required to provide the user with access to the initial data structure than to provide the user with access to the scrambled data structure.

* * * * *